C. W. STARKER.
COLLECTOR RING.
APPLICATION FILED DEC. 6, 1912.
1,108,940.
Patented Sept. 1, 1914.
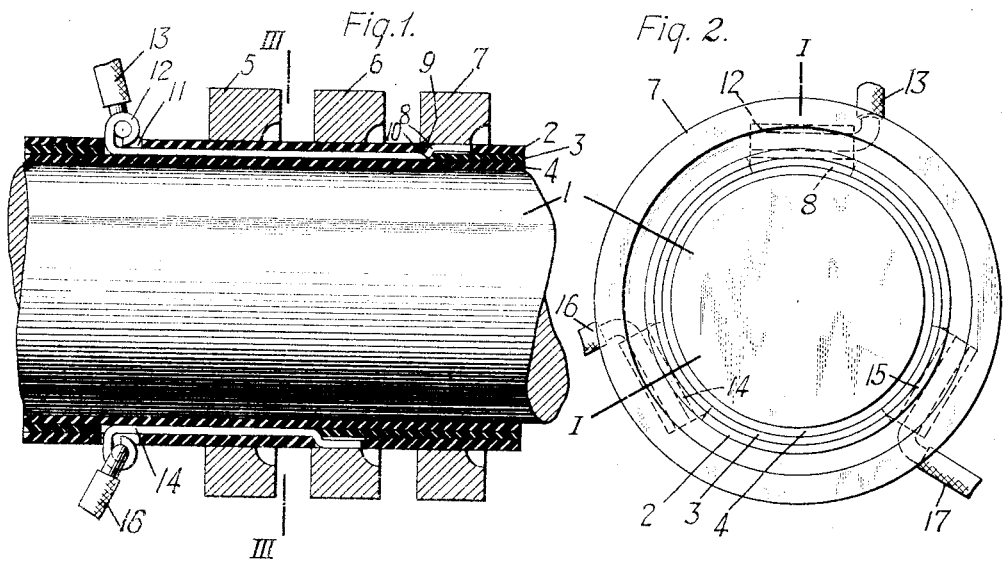
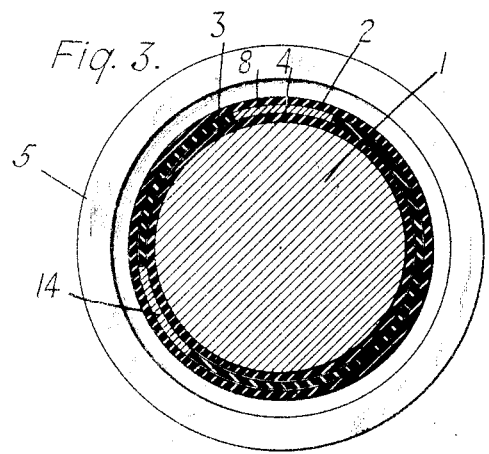
WITNESSES:
INVENTOR
Charles W. Starker
BY
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

COLLECTOR-RING.

1,108,940.  Specification of Letters Patent.  Patented Sept. 1, 1914.

Application filed December 6, 1912. Serial No. 735,238.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Collector-Rings, of which the following is a specification.

This invention relates to collector ring structures for alternating current or other machines which employ relatively movable contact members.

My invention has for its object the provision of a new and simple construction whereby the insulation of collector rings and their terminals may be effected in an improved manner.

In previous devices of this character, it has been necessary to pass the leads through holes drilled in one or more rings, insulating the leads from these rings and then soldering the leads to their respective rings. I propose to use concentric tubes of insulating material upon the shaft in which are contained the terminals for the rings. The rings are placed on the tubes while heated and are allowed to shrink in order to insure a tight fit and good contact with the terminals.

Figure 1 is a longitudinal section on the line I—I of Fig. 2. Fig. 2 is an end view of the collector rings mounted on a shaft. Fig. 3 is a cross-section on the line III—III of Fig. 1.

Upon the shaft 1 of an electric machine are placed concentric tubes 2, 3 and 4 of insulating material, preferably that known in the art as micarta. Mounted upon the outer tube, are collector rings 5, 6 and 7. Connected to ring 7 is a terminal 8 that extends through a slot 9 in the tube 2, a slot 10 in the tube 3, and emerges through the slot 11 in the tube 2, terminating in a loop 12 which is adapted to be connected to a lead 13. In a like manner terminals 14 and 15 are connected to rings 5 and 6 and to leads 16 and 17. The interior surfaces of the rings and the ends of the terminals which are adapted to make contact with the rings, are tinned.

In assembling the structure, the micarta tubes, which have been prepared in the proper sizes, are first concentrically assembled, as shown, and the terminals 8, 14, and 15 are inserted. Then the rings 5, 6 and 7, which have been previously heated, are placed upon the tube 2, over the ends of the terminals, spaced apart as shown, and allowed to cool and thereby shrink into close fit upon the tube 2 and into a good contact with the terminals. The collector is then pressed upon the shaft which may have a knurled surface to insure a rigid connection. The rings are made to fit more closely by the pressing process. It will be noted that, by means of this construction, the terminals may all be brought through to one side of the rings, preferably the inner, so that connections may easily be made to windings of the rotating part of the machine.

As shown the device is provided with three rings and the terminals are placed 120° apart around the shaft. It will be understood that any desired number of rings may be used, the only modifications in construction being the addition of other rings and different spacing of the terminals around the shaft.

The advantages of this construction, aside from the convenient connections stated above, are that the terminals are entirely insulated from the shaft and from the rings under which they extend, while the drilling of holes and the provision of insulation therefor is avoided. Another important advantage is the cheapness of construction, it being possible to construct this device at less than half the cost of the devices in present use. The collectors may be made up in standard sizes and kept in stock for future use.

I claim as my invention:

1. In combination, a tube of insulating material, said tube comprising a plurality of concentric layers having recesses, collector rings upon the said tube, and terminals for said rings located between the inner and the outer concentric layers and in said recesses.

2. In combination, a tube of insulating material, said tube comprising three concentric layers, collector rings spaced apart upon said tube, terminals for said rings extending longitudinally between the inner and the outer concentric layers, the ends of said terminals lying in substantially the same circumference on the outer periphery of the tube.

3. In combination, a tube of insulating material comprising concentric layers having slots, terminals in said slots, and collector rings spaced apart upon said tube and connected to said terminals.

4. In combination, a tube of insulation comprising a plurality of concentric layers, an intermediate layer of said tube having longitudinal slots spaced apart circumferentially and the exterior layer having slots which, in part, register with the first named slot, collector rings mounted on said tube, and terminals in said slots, each of which is connected at one end to one of said rings and at the other end is adapted for external electrical connection.

5. In combination, a tube of insulation adapted to be placed upon a shaft, said tube comprising concentric layers, collector rings spaced apart on said tube, terminals in slots in an intermediate layer, said terminals extending, at one end, through slots in the other layer to connect with said rings and, at the other end, extending through slots in the outer layer and adapted for external electrical connection.

6. In combination, a tube of insulating material composed of three concentric micarta tubes, collector rings on said tubes, terminals for said rings located in slots in the intermediate tube, spaced apart and extending longitudinally, said terminals being adapted for electrical connection outside the rings.

7. In combination, a plurality of concentric tubes of insulating material, a part of said tubes being provided with slots, collector rings spaced apart on said tubes, terminals in the slots in an intermediate tube and extending at their respective ends through the slots in the outer tube to connect to the said rings and to electrical conductors.

In testimony whereof, I have hereunto subscribed my name this 30th day of November, 1912.

CHARLES W. STARKER.

Witnesses:
THEOBALD C. WEIRS,
B. B. HINES.

---

It is hereby certified that in Letters Patent No. 1,108,940, granted September 1, 1914, upon the application of Charles W. Starker, of Pittsburgh, Pennsylvania, for an improvement in "Collector-Rings," an error appears in the printed specification requiring correction as follows: Page 2, line 21, for the word "other" read *outer;* and that the said Letters Patent should be read with this correction therein that the same may conform to the record of the case in the Patent Office.

Signed and sealed this 29th day of September, A. D., 1914.

[SEAL.]

R. F. WHITEHEAD,
*Acting Commissioner of Patents.*